(12) United States Patent
Chang

(10) Patent No.: US 6,894,843 B2
(45) Date of Patent: May 17, 2005

(54) OPTICAL APPARATUS FOR A LINE SCANNER SYSTEM WITH REDUCED OPTICAL TOTAL TRACK

(75) Inventor: Matthew Tsu-Yang Chang, Fremeont, CA (US)

(73) Assignee: Foxlink Image Technology Co., Ltd., Hsinchu (TW)

( * ) Notice: Subject to any disclaimer, the term of this patent is extended or adjusted under 35 U.S.C. 154(b) by 0 days.

(21) Appl. No.: 10/443,810

(22) Filed: May 23, 2003

(65) Prior Publication Data
US 2004/0233543 A1 Nov. 25, 2004

(51) Int. Cl.[7] .......................... G02B 3/04; G02B 13/18; H04N 1/191
(52) U.S. Cl. .................. 359/662; 359/708; 358/494
(58) Field of Search ................ 359/196, 197, 359/204–207, 662, 708, 710, 711, 713–717; 358/474, 482, 483, 494–497, 505; 347/244, 232, 258

(56) References Cited

U.S. PATENT DOCUMENTS

| | | | | |
|---|---|---|---|---|
| 4,514,626 A | * | 4/1985 | Tateoka et al. ............. 250/235 |
| 4,712,884 A | * | 12/1987 | Sakuma et al. ............. 359/711 |
| 5,113,268 A | * | 5/1992 | Yoshida et al. ............. 358/474 |
| 5,815,301 A | * | 9/1998 | Naiki et al. ................. 359/205 |
| 6,091,532 A | * | 7/2000 | Nakanishi et al. .......... 359/207 |
| 6,307,661 B1 | * | 10/2001 | Fujibayashi et al. ........ 359/207 |
| 6,396,616 B1 | * | 5/2002 | Fitzer et al. ................ 359/206 |
| 6,507,444 B2 | * | 1/2003 | Hayashide et al. ......... 359/720 |
| 6,606,207 B2 | * | 8/2003 | Tochigi ...................... 359/750 |
| 6,633,423 B2 | * | 10/2003 | Ishibe ........................ 359/205 |
| 6,667,822 B2 | * | 12/2003 | Yoshida ..................... 359/207 |
| 2003/0206322 A1 | * | 11/2003 | Atsuumi et al. ............ 359/205 |

* cited by examiner

Primary Examiner—Scott J. Sugarman
Assistant Examiner—Deborah A. Raizen
(74) Attorney, Agent, or Firm—Rosenberg, Klein & Lee

(57) ABSTRACT

An optical apparatus for a line scanner system comprises a main lens group, an aspherical field flattener lens and a line sensor arranged sequentially along the same optical axis. The main lens group consists of four rotationally symmetrical lenses for refracting and converging light beams into focus. The field flattener lens is rotationally symmetrical in its optical profile and shapes as a strip oriented along the direction of the line image. The field flattener lens is arranged between the main lens group and the line sensor and closer to the line sensor for refracting the light beam to the line sensor in a relatively wide field angle, and as a result, various aberrations have been corrected while the optical total track also has been reduced. And an image plane is provided in the line sensor for the linear light beam, in which the instantaneous field of view is a line.

13 Claims, 8 Drawing Sheets

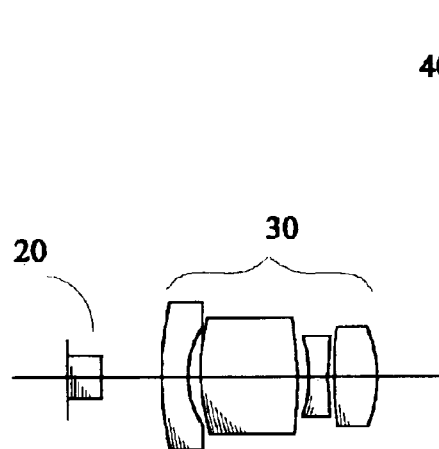
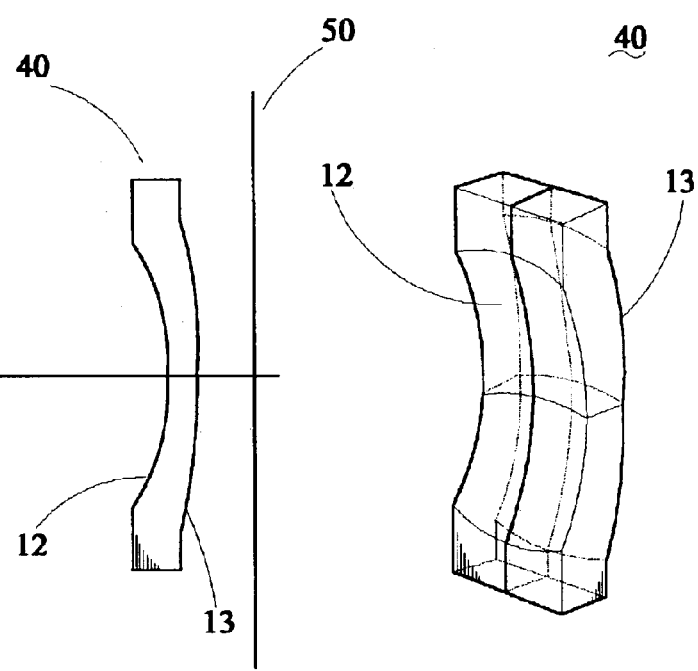
Fig. 1
Fig. 2

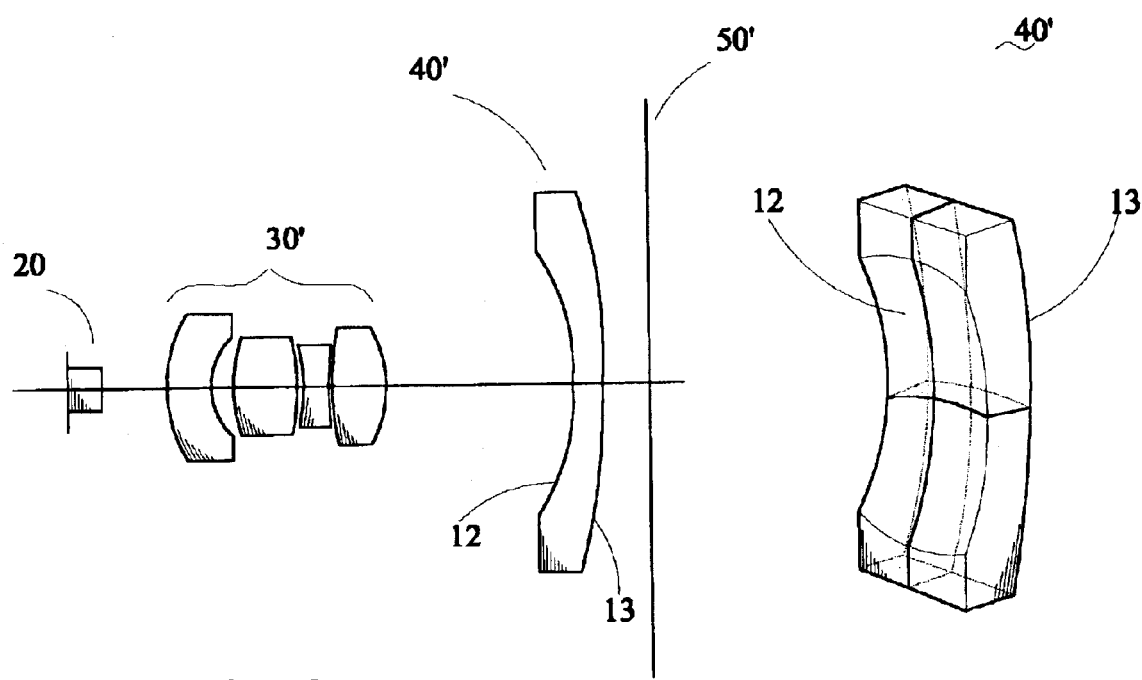

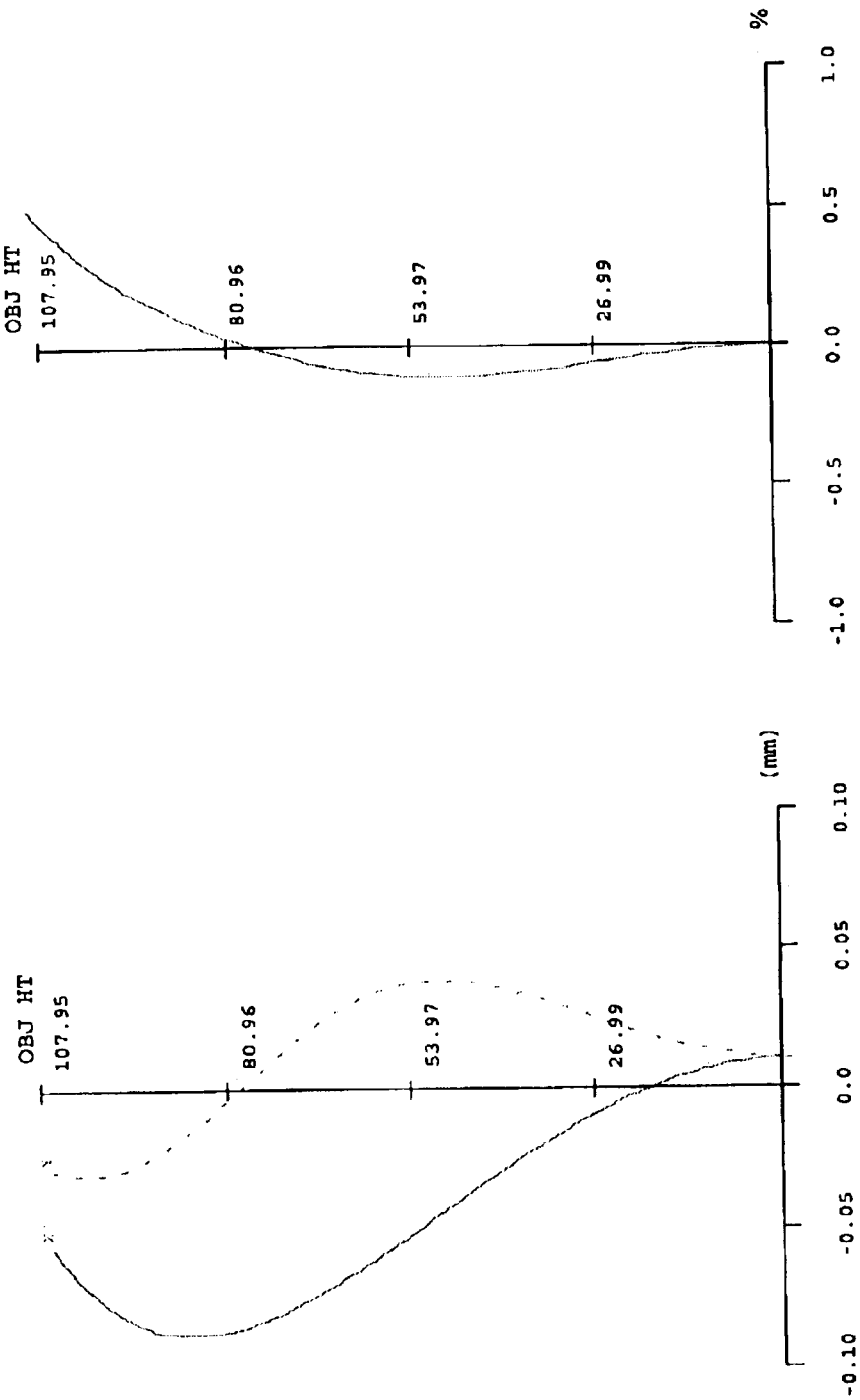

OPTICAL APPARATUS FOR A LINE SCANNER SYSTEM WITH REDUCED OPTICAL TOTAL TRACK

BACKGROUND OF THE INVENTION

1. Field of the Invention

This invention relates to an optical apparatus for a line scanner system, and more particularly, to an optical apparatus which provides a relative wider field angle resulting in reduced optical total track and high image quality for a line scanner system.

2. The Related Art

It is well known in the field of optical design that the application of a low power optical element near or at an image plane is effective in correcting residual field aberration. Such concept is commonly applied to designs such as projections, reconnaissance lenses that require high flat field optical performance. Depending on its effect in the correction of residual field curvature as well as astigmatism and distortion, a field lens is also commonly known as a field flattener.

Field flatteners were first used in the Petzval type of lenses. The classic Petzval type lenses are described in U.S. Pat. No. 65,729, German Pat. No. 5761, Great Britain Pat. No. 4756 and U.S. Pat. No. 1,479,251. The classic Petzval type lenses suffer from residual astigmatism and field curvature. With the introduction of a suitably designed field flattener, a much more favorable image performance can be obtained, without having to resort to a significantly more complex optical design. Such systems are described in Great Britain Pat. No. 127058, U.S. Pat. Nos. 2,076,190, 2,541, 484 and 2,649,021. The field flattener lenses in these systems are of spherical construction in which the profiles of the optical surfaces are spherical. Further, such field flatteners are positioned between the main converging lens group and the focal plane and close to the focal plane, thereby accomplishing the aberration correction requirement.

Without incorporating a field lens, a lens group could be designed to have similar flat field performance. However such lens group would normally have a more complex design. More lens elements would be needed to accomplish the same level of optical aberration correction as in a lens group with a field flattener. The introduction of a field lens in the optical design is an elegant way of simplifying a lens group, which would otherwise be a complex design, while maintaining a high level of optical performance.

An aspherical profile can also be applied to the field flattener with the added benefit of further improvement in aberration correction. The result is a high performance optical system. An example of such system is disclosed in U.S. Pat. No. 2,803,997. In the same patent, a system with relatively wide angle of field of view was disclosed using the field flattener techniques, indicating that the use of aspherical field flattener can be advantageous in aberration correction in wide-angle applications.

The aforementioned examples are optical apparatus designs corrected for a sufficiently broad spectrum, for example, the visible spectrum. There also exists a class of optical apparatus that incorporates field flatteners in the close proximity of the image plane, whereby the optical aberration correction are limited to within a narrow spectrum band. For instance, some lenses each having at least an aspherical profile can be applied to optical apparatuses in monochromatic laser scanning applications, as a field flattener with the added benefit of aberration correction. Some typical examples of such optical apparatus adapted for use in a laser scanning system are described in U.S. Pat. Nos. 5,179,465 and 6,535,317. In these patents, it is characterized that a laser light source is utilized to emit a narrow wavelength band light beam and a rotating polygon mirror is used to reflect and put the light beam into a sweeping motion in the main scanning plane so that the instantaneous field of view is a spot. In addition, a lens in the form of a strip having at least an aspherical surface is arranged for aberration correction as a field flattener. Further, such optical apparatus has to be designed to realize satisfactory f-theta characteristics of distortion correction. Typically, the aspherical profile is bi-laterally symmetrical, following the mathematical description of a toric surface. The overall optical design is not suitable for broadband imaging applications.

Optical total track is defined as the axial distance from the object plane to the image plane. This particular optical property has great significance in a finite conjugate imaging system in which the distance between the object plane and the lens system is of finite value. In addition, the distance between the lens and the image plane generally has a finite fixed value. Therefore the optical total track is generally a fixed value. For first order approximation in optical calculation, given a fixed object size and magnification ratio, also known as reduction ratio, the total track is inversely proportional to the tangent of the field angle. A short optical total track means wide angular field. Generally, for a line-scanning device, such as a flatbed document scanner, it is desirable to have a short optical total track, which will afford a compact packaging of the device. This poses a specific difficulty in the design of the image forming optics. Due to the short total track requirement, the image forming optics would have to have a wide angular field of view while providing adequate level of optical aberration correction. This will inevitably necessitate a complex optical design. However, with the introduction of a field lens of the proper design, the complexity optical design can be substantially simplified, affording a system that can be economically produced, while maintaining a high level of optical performance.

SUMMARY OF THE INVENTION

The object of the present invention is to provide a unique optical apparatus which has reduced optical total track and high image quality over relatively wider field angle for a broadband line scanner system.

It is an additional object of the present invention is to provide an optical apparatus for a line scanner system in which the instantaneous field of view is a line across the width of the document and rectilinear distortion can be sufficiently corrected.

It is another object of the present invention is to provide an achromatic optical apparatus for a line scanner system in which the aberration correction is broad-spectrum.

It is another object of the present invention is also to provide an optical apparatus for a line scanner system which has a simple and compact construction to achieve a uniform scan and correct varied aberrations with relatively low cost.

In order to achieve the objects described above, the optical apparatus for a line scanner system according to the present invention comprises a main lens group, an aspherical field flattener lens and a line sensor arranged sequentially along the same optical axis. The main lens group consists of required number of rotationally symmetrical lenses for refracting and converging light beams into focus. The field flattener lens is rotationally symmetrical in its optical profile and shapes as a strip oriented along the direction of the line image. The field flattener lens is arranged between the main lens group and the line sensor and closer to the line sensor for refracting the light beam to the line sensor in a relatively wide field angle, and as a result, various aberrations have been corrected while the optical total track also has been reduced. And an image plane is provided in the line sensor for the linear light beam, in which the instantaneous field of view is a line.

A detailed explanation of the present invention will be given herebelow, with reference to the accompanying drawings of the preferred embodiments of the invention, which, however, should not be taken to be limitative to the present invention, but for better understanding thereof to those skilled in the art. In the drawings:

BRIEF DESCRIPTION OF THE DRAWINGS

FIG. 1 is a cross-sectional view showing an optical apparatus of the first embodiment in accordance with the present invention;

FIG. 2 is a perspective view showing the field flattener lens of the optical apparatus in accordance with the present invention as shown in FIG. 1;

FIG. 6 is a cross-sectional view showing an optical apparatus of the second embodiment in accordance with the present invention;

FIG. 7 is a perspective view showing the field flattener lens of the optical apparatus in accordance with the present invention as shown in FIG. 6;

FIGS. 8A and 8B are diagrams respectively showing astigmatism and distortion of an optical apparatus of the second embodiment in accordance with the present invention as shown in FIG. 6;

DETAILED DESCRIPTION OF THE PREFERRED EMBODIMENT

Figure 3B:
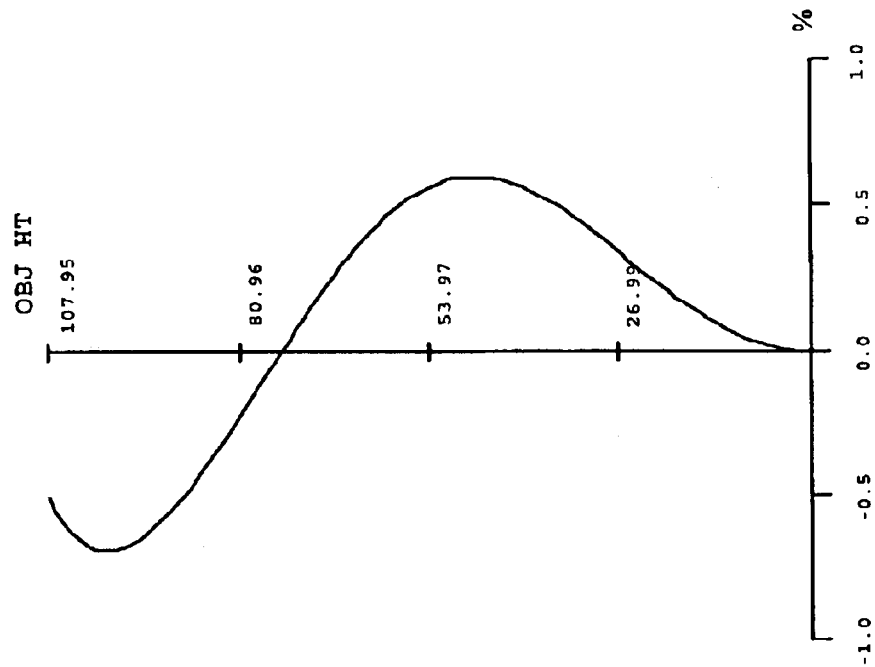
FIGS. 3A and 3B are diagrams respectively showing astigmatism and distortion of an optical apparatus of the first embodiment in accordance with the present invention as shown in FIG. 1.

In accordance with the present invention, the optical apparatus for a line scanner system comprises a broadband light source, a main lens group, a field flattener lens group and a line sensor arranged sequentially along the same optical axis. The broadband light source can be selected to emit visible spectrum light beams. The main lens group consists of required amount of rotationally symmetrical lenses for refracting and converging the light beams into focus. The field flattener lens group consists at least an aspherical lens which is rotationally symmetrical in its optical profile and shapes as a strip oriented along the direction of the line image. The field flattener lens group is arranged between the main lens group and the line sensor and closer to the line sensor for refracting the light beam to the line sensor in a relatively wide field angle, and as a result, various aberrations have been corrected while the optical total track also has been reduced. And each field flattener lens is to be made out of polymer material which can be replicated using conventional high precision optical molding techniques with low cost, such as injection molding or compression molding. A CCD sensor is usually selected as the line sensor to provide an image plane for the linear light beam, in which the instantaneous field of view is a line.

Based on the above-described principal construction of the optical apparatus, two embodiments with specific values will be described respectively in detail hereinbelow with reference to the accompanying drawings.

As shown in FIGS. 1 and 2, the optical apparatus of the first embodiment according to the present invention consists of a broadband light source 20, a main lens group 30, an aspherical field flattener lens 40 and a CCD sensor 50 arranged sequentially along the optical axis O. The broadband light source 20 emits visible spectrum light beams. The main lens group 30 consists of four rotationally symmetrical lenses for converging the light beams into a linear light beam. The specific values of this embodiment will be described in the following Table 1. In Table 1, r denotes the radius of curvature, in millimeters, of an individual lens surface, d is the thickness in millimeters between two adjacent optical surfaces, $N_d$ is the refractive index at 587.56 nm, and $V_d$ is the Abbe number.

TABLE 1

| Surface No. | R | D | $N_d$ | $V_d$ |
| --- | --- | --- | --- | --- |
| 1 | Plano | 3.00 | 1.516800 | 64.2 |
| 2 | Plano | 148.02 | | |
| 3 | 60.960 | 2.00 | 1.548140 | 45.8 |
| 4 | 8.452 | 1.00 | | |
| 5 | 12.053 | 11.18 | 1.883000 | 40.8 |
| 6 | −147.885 | 0.25 | | |
| 7 | Plano | 0.25 | | |
| 8 | −25.134 | 1.50 | 1.922860 | 20.9 |
| 9 | 35.545 | 0.50 | | |
| 10 | 144.650 | 3.32 | 1.883000 | 40.8 |
| 11 | −13.058 | 23.18 | | |
| 12 | Aspheric | 2.00 | 1.493581 | 57.5 |
| 13 | Aspheric | 2.00 | | |
| 14 | Plano | 0.70 | 1.493581 | 57.5 |
| 15 | Plano | | | |

The field flattener lens 40 is rotationally symmetrical optical profile in the shape of strip and positioned between the main lens group 30 and an image plane provided in the CCD sensor 50 and closer to the CCD sensor 50. The field flattener lens 40 is oriented such that the length thereof aligns with the direction of the line image. The two optical surfaces 12 and 13 of the field flattener lens 40 are aspherical as described in the above Table 1. The aspherical surface profile can be expressed by:

$$X = (CY^2/(1+\sqrt{(1-(1+K)C^2Y^2)})) + A_4Y^4 + A_6Y^6 + A_8Y^8 + A_{10}Y^{10}$$

Where X is the distance by which the coordinates at the point of the aspherical surface where the height from the optical axis is Y extend from the tangential plane to the vertex of the aspherical surface C is the curvature (1/r) of the vertex of the aspheric surface; K is the conic constant; and $A_4$, $A_6$, $A_8$ and $A_{10}$ are the aspherical coefficient of the fourth, sixth, eight and tenth orders respectively. The respective values of the conic constants and aspheric coefficients are tabulated in Table 2.

TABLE 2

| Surface No. 12 | Surface No. 13 |
|---|---|
| C = −0.010000 | C = −0.010000 |
| K = −1.000000 | K = −1.000000 |
| $A_4$ = −0.190435 × $10^{-3}$ | $A_4$ = −0.147307 × $10^{-3}$ |
| $A_6$ = 0.454775 × $10^{-6}$ | $A_6$ = 0.262378 × $10^{-6}$ |
| $A_8$ = 0.000000 | $A_8$ = 0.000000 |
| $A_{10}$ = 0.000000 | $A_{10}$ = 0.000000 |

The CCD sensor 50 has a length of 40.8 mm with 4-micron pixel size. The specific values of this embodiment in contrast to the conventional counterpart without any field flattener lens design are shown in the following Table 3.

TABLE 3

|  | Conventional design | First embodiment of this invention |
|---|---|---|
| Magnification | | 0.189× |
| Operating wavelength | | 550 nm |
| Effective focal length | ~37 mm | 24.12 mm |
| F-number | ~7.2 | 7.25 |
| Half field angle | ~24.5 deg | 34.21 deg |
| Total track | 280 mm | 200 mm |
| Improvement | | 28% reduction on the optical total track |

As described in Table 3, the optical apparatus of the first embodiment according to the present invention has 28% reduction on the optical total track by means of the aspherical field flattener lens 40 providing a relatively wider field angle compared with the conventional counterparts.

Figure 3A:
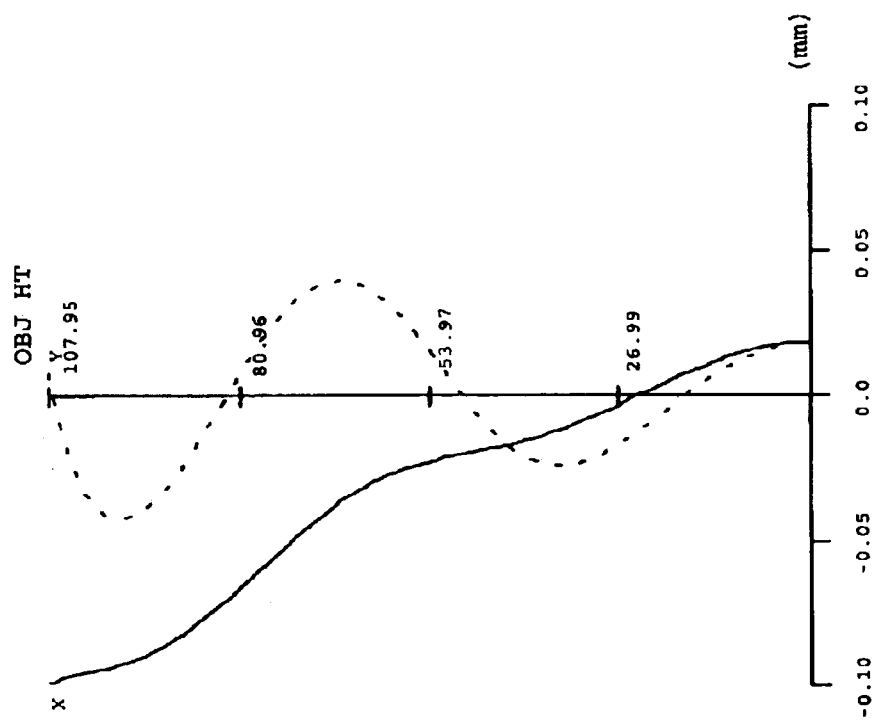
Figure 4:
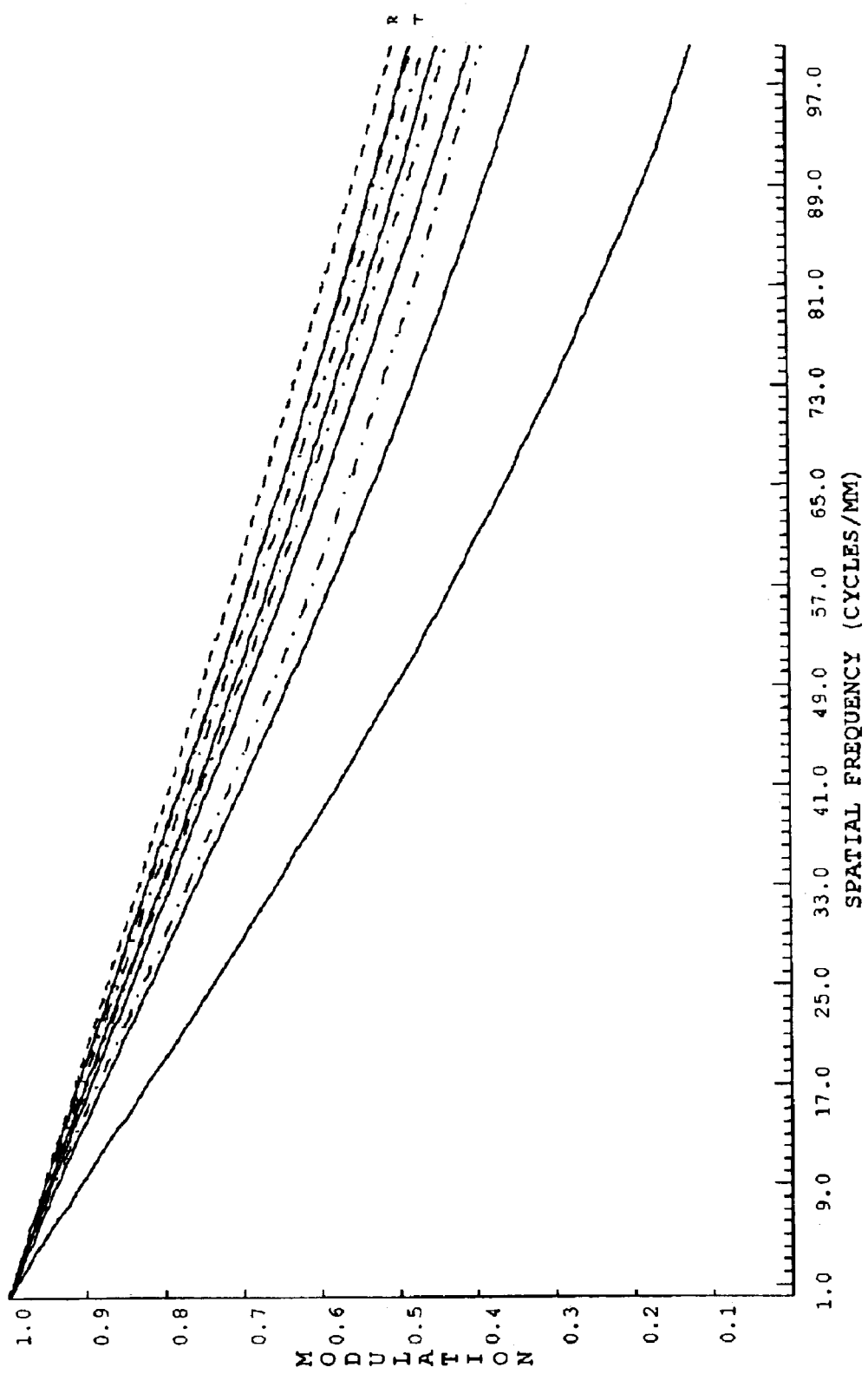
FIG. 4 is a diagram showing diffraction MTF curves of an optical apparatus of the first embodiment in accordance with the present invention as shown in FIG. 1.
Figure 5:
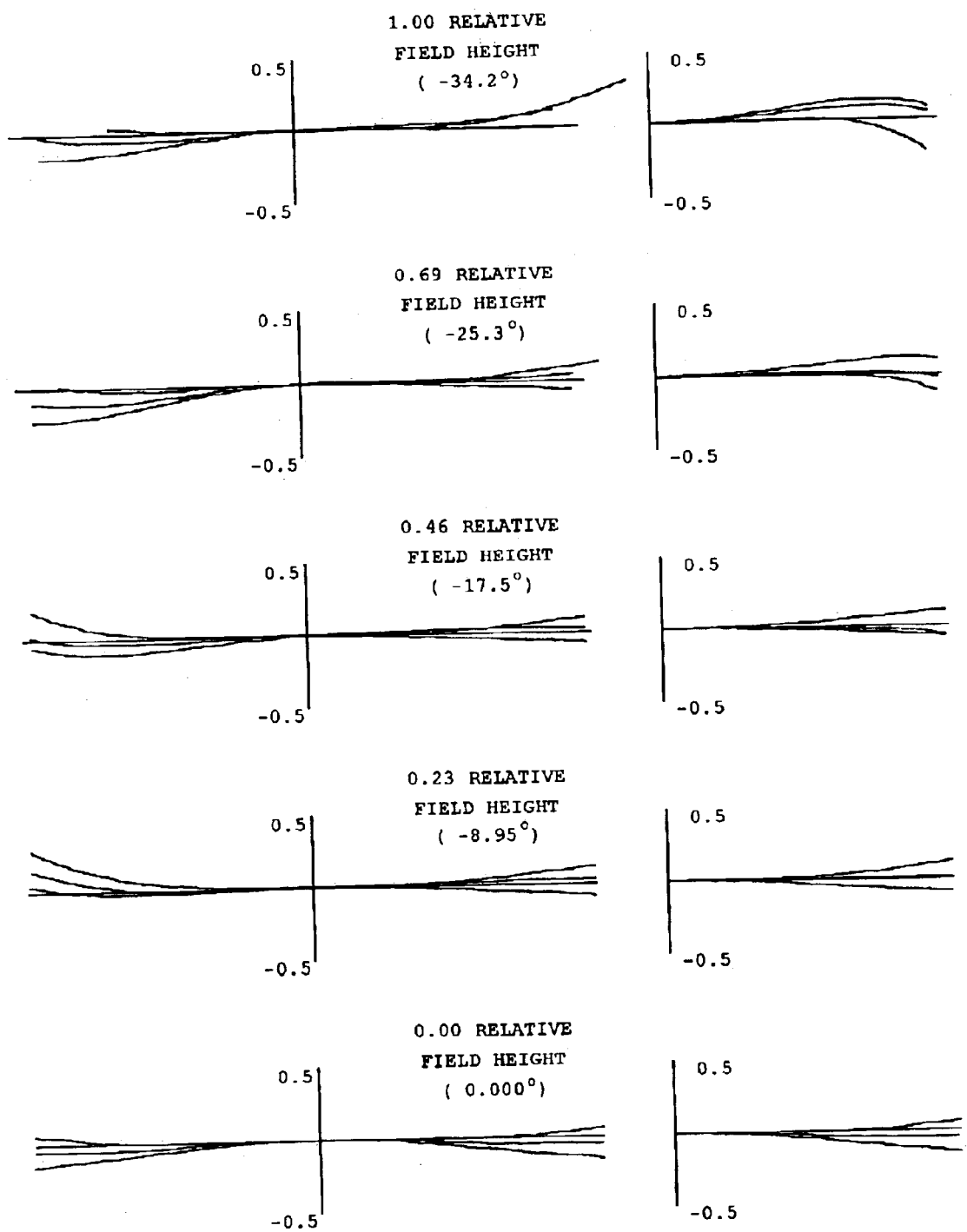
FIG. 5 is a diagram showing relationship between defocus and spot diameter of an optical apparatus of the first embodiment in accordance with the present invention as shown in FIG. 1.

Moreover, FIGS. 3A and 3B show respectively astigmatism and distortions of the optical apparatus of the first embodiment according to the present invention. In the FIG. 3A showing astigmatism, a solid line indicates a sagittal image plane and a broken line indicates a meridional plane. In addition, FIGS. 4 and 5 show respectively diffraction MTF curves and relationship between defocus and spot diameter of the optical apparatus of the first embodiment according to this invention. By the way, the similar symbols used in this embodiment are used in all diagrams showing aberration of another embodiment. As is apparent from the respective diagrams mentioned above, excellent correction is made for the varied aberrations and good image quality is obtained.

With reference to FIGS. 6 and 7, the optical apparatus of the second embodiment according to the present invention also consists of a broadband light source 20 emitting visible spectrum light beams, a main lens group 30', an aspherical field flattener lens 40' in the shape of strip and a CCD sensor 50' arranged sequentially along the optical axis O'. The main lens group 30' consists of four rotionally symmetrical lenses which have different structure and values compared with them in the first embodiment for converging the light beams into a linear light beam as shown in Table 4. In Table 4, r denotes the radius of curvature, in millimeters, of an individual lens surface, d is the thickness between two adjacent optical surfaces, $N_d$ is the refractive index at 587.56 nm, and $V_d$ is the Abbe number.

TABLE 4

| Surface No. | R | D | $N_d$ | $V_d$ |
|---|---|---|---|---|
| 1 | Plano | 3.00 | 1.516800 | 64.1 |
| 2 | Plano | 121.03 | | |
| 3 | 8.492 | 2.00 | 1.487489 | 70.4 |
| 4 | 2.940 | 1.35 | | |
| 5 | 9.871 | 2.90 | 1.820168 | 29.7 |
| 6 | −28.425 | 0.10 | | |
| 7 | Plano | 0.10 | | |
| 8 | −10.184 | 1.50 | 1.922860 | 20.9 |
| 9 | 14.556 | 0.10 | | |
| 10 | 25.244 | 2.00 | 1.787997 | 47.5 |
| 11 | −4.961 | 10.12 | | |
| 12 | Aspheric | 2.00 | 1.493581 | 57.5 |
| 13 | Aspheric | 2.00 | | |
| 14 | Plano | 0.70 | 1.493581 | 57.5 |
| 15 | Plano | | | |

The field flattener lens 40' also has different structure and values compared with that in the first embodiment. The two optical surfaces 12 and 13 of the field flattener lens 40 are aspherical as described in the above Table 4. The aspherical surface profile can be expressed by:

$$X=(CY^2/(1+\sqrt{(1-(1+K)C^2Y^2)}))+A_4Y^4+A_6Y^6+A_8Y^8+A_{10}Y^{10}$$

Where X is the distance by which the coordinates at the point of the aspherical surface where the height from the optical axis is Y extend from the tangential plane to the vertex of the aspherical surface C is the curvature (1/r) of the vertex of the aspheric surface; K is the conic constant; and $A_4$, $A_6$, $A_8$ and $A_{10}$ are the aspherical coefficient of the fourth, sixth, eight and tenth orders respectively. The respective values of the conic constant and aspheric coefficients are tabulated in Table 5.

TABLE 5

| Surface No. 12 | Surface No. 13 |
|---|---|
| C = −0.010000 | C = 0.000000 |
| K = −1.000000 | K = −1.000000 |
| $A_4$ = −0.840490 × $10^{-3}$ | $A_4$ = −0.533770 × $10^{-3}$ |
| $A_6$ = 0.101137 × $10^{-5}$ | $A_6$ = 0.331089 × $10^{-5}$ |
| $A_8$ = 0.000000 | $A_8$ = 0.000000 |
| $A_{10}$ = 0.000000 | $A_{10}$ = 0.000000 |

The CCD sensor 50' in this embodiment has a length of 20.4 mm with 4-micron pixel size. The specific values of this embodiment in contrast to the conventional counterpart without any field flattener lens design are shown in the following Table 6.

TABLE 6

|  | Conventional design | Second embodiment of this invention |
|---|---|---|
| Magnification | | 0.0945× |
| Operating wavelength | | 550 nm |
| Effective focal length | ~14 mm | 11.29 mm |
| F-number | ~6.5 | 7.25 |
| Half field angle | ~33 deg | 40.29 deg |
| Total track | 183 mm | 150 mm |
| Improvement | | 18% reduction on the optical total track |

As described in Table 6, the optical apparatus of the second embodiment according to the present invention has 18% reduction on the optical total track by means of the aspherical field flattener lens 40' providing a relatively wider field angle compared with the conventional counterparts.

Figure 9:
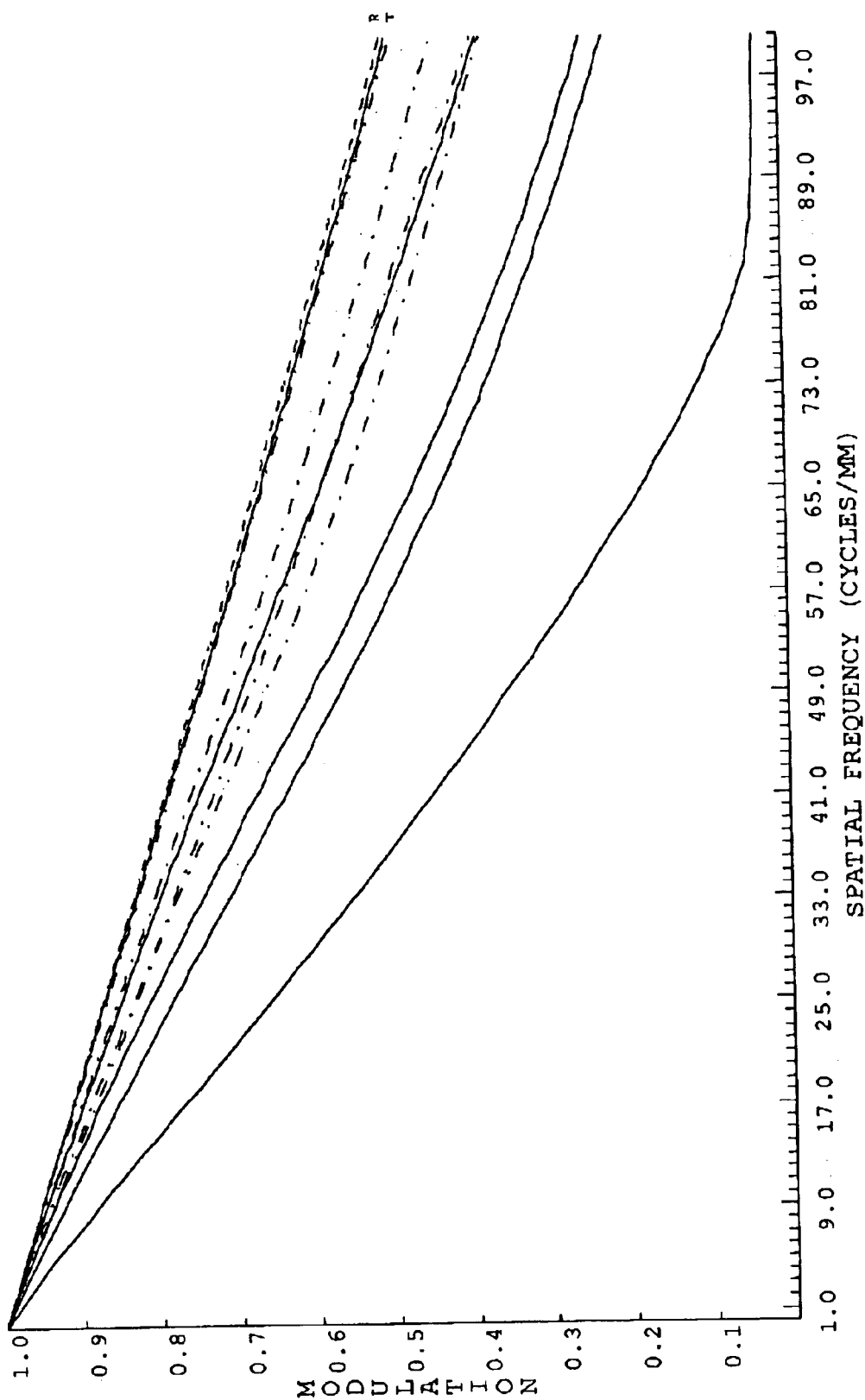
FIG. 9 is a diagram showing diffraction MTF curves of an optical apparatus of the second embodiment in accordance with the present invention as shown in FIG. 6.
Figure 10:
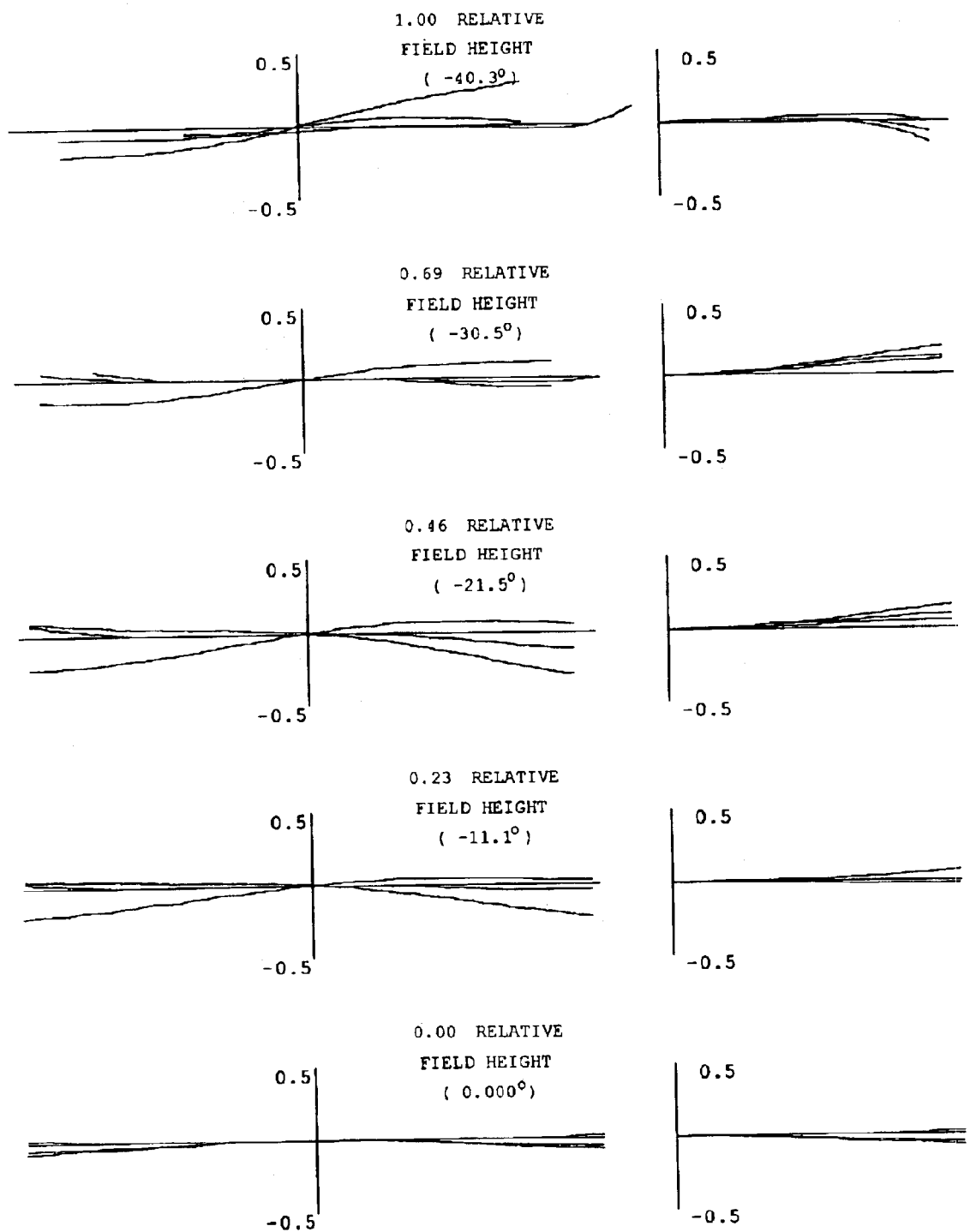
FIG. 10 is a diagram showing relationship between defocus and spot diameter of an optical apparatus of the second embodiment in accordance with the present invention as shown in FIG. 6.

Furthermore, FIGS. 8A and 8B show respectively astigmatism and distortions of the optical apparatus of the second embodiment according to this invention. In addition, FIGS. 9 and 10 show respectively diffraction MTF curves and relationship between defocus and spot diameter of the optical apparatus of this embodiment. As is apparent from the respective diagrams mentioned above, excellent correction is made for the varied aberrations and good image quality is obtained.

As mentioned above, the aspherical field flattener lens 40 and 40' in the shape of strip is utilized to achieve the purpose of the optical total track reduction and aberration correction over relatively wider field angle, and hence, the optical apparatus for a line scanner system according to the present invention can be more compact with high image quality. Particularly, rectilinear distortion can be sufficiently corrected by means of the strip-shaped aspherical field flattener lens 40 and 40' in the achromatic optical apparatus according the present invention.

While the present invention has been described with respect to what are presently considered to be the preferred embodiments, it is to be understood that the invention is not limited to the disclosed embodiments. Contrarily, the present invention is intended to cover various modifications and equivalent arrangements that may be resorted to within the spirit and scope of the claims thereof.

What is claimed:

1. An optical apparatus for a line scanner system comprising:
  a broadband light source for emitting light beams;
  a main lens group for converging said light beams into focus;
  at least an aspherical field flattener lens in the shape of a strip for refracting said light beams; and
  an image plane provided for said light beams in which the instantaneous field of view is a line;
  wherein said field flattener lens is arranged between said main lens group and said image plane.

2. The optical apparatus as claimed in claim 1, wherein said light beams emitted from said broadband light source can be visible spectrum.

3. The optical apparatus as claimed in claim 1, wherein said broadband light source, said main lens group, said field flattener lens and said image plane are arranged sequentially along the same optical axis.

4. The optical apparatus as claimed in claim 1, wherein said main lens group comprises required amount of rotationally symmetrical lenses.

5. An optical apparatus for a line scanner system comprising:
  a main lens group for converging light beams into focus;
  at least an aspherical field flattener lens in the shape of a strip for refracting said light beams, said field flattener lens being rotationally symmetrical; and
  an image plane provided for said light beams in which the instantaneous field of view is a line;
  wherein said field flattener lens is arranged between said main lens group and said image plane.

6. The optical apparatus as claimed in claim 1, wherein said field flattener lens is positioned closer to said image plane than to said main lens group and oriented such that the length of the strip aligns with the length of the image.

7. The optical apparatus as claimed in claim 1, wherein said field flattener lens can be made out of polymer material.

8. The optical apparatus as claimed in claim 7, wherein said field flattener lens can be replicated using injection molding.

9. The optical apparatus as claimed in claim 7, wherein said field flattener lens can be replicated using compression molding.

10. An optical apparatus for a line scanner system comprising:
  a main lens group for converging light beams into focus;
  at least an aspherical field flattener lens in the shape of a strip for refracting said light beams, said field flattener lens being rotationally symmetrical; and
  an image plane provided for said light beams in which the instantaneous field of view is a line, said image plane being provided in a line sensor.

11. The optical apparatus as claimed in claim 10, wherein said line sensor can be a CCD sensor.

12. The optical apparatus as claimed in claim 1, wherein said main lens group comprises four rotationally symmetrical lenses for converging said light beams into focus, and the specific values of said optical apparatus are described in the table below:

| Surface No. | r | d | $N_d$ | $V_d$ |
| --- | --- | --- | --- | --- |
| 1 | Plano | 3.00 | 1.516800 | 64.2 |
| 2 | Plano | 148.02 | | |
| 3 | 60.960 | 2.00 | 1.548140 | 45.8 |
| 4 | 8.452 | 1.00 | | |
| 5 | 12.053 | 11.18 | 1.883000 | 40.8 |
| 6 | −147.885 | 0.25 | | |
| 7 | Plano | 0.25 | | |
| 8 | −25.134 | 1.50 | 1.922860 | 20.9 |
| 9 | 35.545 | 0.50 | | |
| 10 | 144.650 | 3.32 | 1.883000 | 40.8 |
| 11 | −13.058 | 23.18 | | |
| 12 | Aspheric | 2.00 | 1.493581 | 57.5 |
| 13 | Aspheric | 2.00 | | |
| 14 | Plano | 0.70 | 1.493581 | 57.5 |
| 15 | Plano | | | | wherein, r denotes the radius of curvature, in millimeters, of each individual lens surface, d is the thickness in millimeters between two adjacent optical surfaces, $N_d$ is the refractive index at 587.56 nm, and $V_d$ is the Abbe number; said field flattener lens has rotationally symmetrical optical profiles and is oriented such that the length thereof aligns with the direction of the line image, with said aspherical surface profile thereof expressed by:

$$X=(CY^2/(1+\sqrt{(1-(1+K)C^2Y^2)}))+A_4Y^4+A_6Y^6+A_8Y^8+A_{10}Y^{10}$$

where, X is the distance by which the coordinates at the point of the aspherical surface where the height from the optical axis is Y extend from the tangential plane to the vertex of the aspherical surface C is the curvature (1/r) of the vertex of the aspheric surface; K is the conic constant; $A_4$, $A_6$, $A_8$ and $A_{10}$ are the aspherical coefficient of the fourth, sixth, eight and tenth orders respectively; and the respective values of the conic constants and aspheric coefficients are as follows:

| Twelfth surface | Thirteenth surface |
| --- | --- |
| C = −0.010000 | C = −0.010000 |
| K = −1.000000 | K = −1.000000 |
| $A_4$ = −0.190435 × $10^{-3}$ | $A_4$ = −0.147307 × $10^{-3}$ |
| $A_6$ = 0.454775 × $10^{-6}$ | $A_6$ = 0.262378 × $10^{-6}$ |

-continued

| Twelfth surface | Thirteenth surface |
|---|---|
| $A_8 = 0.000000$ | $A_8 = 0.000000$ |
| $A_{10} = 0.000000$ | $A_{10} = 0.000000$ | and said image plane is provided in a CCD sensor which has a length of 40.8 mm with 4-micron pixel size;
the specific values of said optical apparatus in contrast to the conventional counterpart without any field flattener lens design is shown in the table below:

|  | Conventional design | First embodiment of this invention |
|---|---|---|
| Magnification |  | 0.189× |
| Operating wavelength |  | 550 nm |
| Effective focal length | ~37 mm | 24.12 mm |
| F-number | ~7.2 | 7.25 |
| Half field angle | ~24.5 deg | 34.21 deg |
| Total track | 280 mm | 200 mm |
| Improvement |  | 28% reduction on the optical total track | whereby said optical apparatus has 28% reduction on the optical total track compared with the conventional counterparts.

13. The optical apparatus as claimed in claim 1, wherein said main lens group comprises four rotationally symmetrical lenses for converging said light beams into focus, and the specific values of said optical apparatus are described in the table below:

| Surface No. | r | d | $N_d$ | $V_d$ |
|---|---|---|---|---|
| 1 | Plano | 3.00 | 1.516800 | 64.1 |
| 2 | Plano | 121.03 |  |  |
| 3 | 8.492 | 2.00 | 1.487489 | 70.4 |
| 4 | 2.940 | 1.35 |  |  |
| 5 | 9.871 | 2.90 | 1.820168 | 29.7 |
| 6 | −28.425 | 0.10 |  |  |
| 7 | Plano | 0.10 |  |  |
| 8 | −10.184 | 1.50 | 1.922860 | 20.9 |
| 9 | 14.556 | 0.10 |  |  |
| 10 | 25.244 | 2.00 | 1.787997 | 47.5 |
| 11 | −4.961 | 10.12 |  |  |
| 12 | Aspheric | 2.00 | 1.493581 | 57.5 |
| 13 | Aspheric | 2.00 |  |  |
| 14 | Plano | 0.70 | 1.493581 | 57.5 |
| 15 | Plano |  |  |  | wherein, r denotes the radius of curvature, in millimeters, of each individual lens surface, d is the thickness in millimeters between two adjacent optical surfaces, $N_d$ is the refractive index at 587.56 nm, and $V_d$ is the Abbe number; said field flattener lens has rotationally symmetrical optical profiles and is oriented such that the length thereof aligns with the direction of the line image, with said aspherical surface profile thereof expressed by:

$$X=(CY^2/(1+\sqrt{1-(1+K)C^2Y^2}))+A_4Y^4+A_6Y^6+A_8Y^8+A_{10}Y^{10}$$

where, X is the distance by which the coordinates at the point of the aspherical surface where the height from the optical axis is Y extend from the tangential plane to the vertex of the aspherical surface C is the curvature (1/r) of the vertex of the aspheric surface; K is the conic constant; $A_4$, $A_6$, $A_8$ and $A_{10}$ are the aspherical coefficient of the fourth, sixth, eight and tenth orders respectively; and the respective values of the conic constants and aspheric coefficients are as follows:

| Twelfth surface | Thirteenth surface |
|---|---|
| $C = -0.010000$ | $C = 0.000000$ |
| $K = -1.000000$ | $K = -1.000000$ |
| $A_4 = -0.840490 \times 10^{-3}$ | $A_4 = -0.533770 \times 10^{-3}$ |
| $A_6 = 0.101137 \times 10^{-5}$ | $A_6 = 0.331089 \times 10^{-5}$ |
| $A_8 = 0.000000$ | $A_8 = 0.000000$ |
| $A_{10} = 0.000000$ | $A_{10} = 0.000000$ | and said image plane is provided in a CCD sensor which has a length of 20.4 mm with 4-micron pixel size;

the specific values of said optical apparatus in contrast to the conventional counterpart without any field flattener lens design is shown in the table below:

|  | Conventional design | Second embodiment of this invention |
|---|---|---|
| Magnification |  | 0.0945× |
| Operating wavelength |  | 550 nm |
| Effective focal length | ~14 mm | 11.29 mm |
| F-number | ~6.5 | 7.25 |
| Half field angle | ~33 deg | 40.29 deg |
| Total track | 183 mm | 150 mm |
| Improvement |  | 18% reduction on the optical total track | whereby said optical apparatus has 18% reduction on the optical total track compared with the conventional counterparts.

* * * * *